Figure 1:
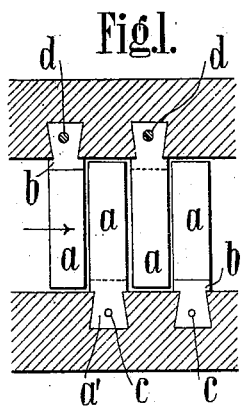

No. 845,901. PATENTED MAR. 5, 1907.
R. SCHULZ.
FASTENING OF BLADES IN TURBINES.
APPLICATION FILED JAN. 26, 1906.

2 SHEETS—SHEET 1.

Witnesses.
H. L. Amer.
P. Bommers.

Inventor.
Richard Schulz.
by Henry Orth
atty.

UNITED STATES PATENT OFFICE.

RICHARD SCHULZ, OF BERLIN, GERMANY.

FASTENING OF BLADES IN TURBINES.

No. 845,901.  Specification of Letters Patent.  Patented March 5, 1907.

Application filed January 26, 1906. Serial No. 298,036.

*To all whom it may concern:*

Be it known that I, RICHARD SCHULZ, a subject of the King of Prussia, residing at Berlin, Germany, have invented certain new and useful Improvements in Turbines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to and has for its object the fastening of blades in annular grooves in the rotating or fixed parts of steam-turbines or the like in which the roots of the blades are provided with borings passing through them or with hollows or very narrow incisions and spaced by similar intermediate pieces that are firmly held in the annular grooves by driving mandrels or wedges tangentially into these borings, hollows, or incisions. By thus opening out or wedging the roots of the blades or intermediate pieces they are expanded in such a way that they fill up undercuts or lateral indentations in the annular grooves, and are thereby immovably fixed therein. After being opened out pins may for the purpose of increased security be driven into the borings or incisions to join several blades and intermediate pieces firmly with one another.

In the improved fastening of the blades in annular grooves forming the subject of my present invention the hammering down of the joints of intermediate pieces between the roots of the blades is entirely avoided and the blades and contiguous intermediate pieces keep their exact position in the parts of the turbine after having been inserted, and the steam takes exactly the designed course between the blades. My new fastening is particularly adapted for blades which have their greatest thickness in the middle of the cross-section of the blade; but it is equally suitable for blades the greatest thickness of which is not in the middle of the cross-section of the blade.

Fastenings of the blades of steam-turbines are well known in which annular grooves are provided in the rotating wheel which extend at the bottom into two narrow undercut auxiliary grooves. Narrow continuations corresponding to branch grooves are formed on the roots of the blades and pressed into the narrow branch grooves in a radial direction when driving in the blades. One of the great objections to fastenings of this character is that the continuations fit less tightly at the outside surfaces of the branch grooves. A further objection is that the material tends to strongly spring back from them. Therefore it is always a more or less loose and insecure fastening. These objections are overcome in my present invention.

I illustrate in the accompanying drawings examples of different modes of fastening blades according to my present invention, in which—

Figure 2:
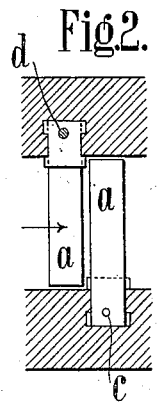
Figure 3:
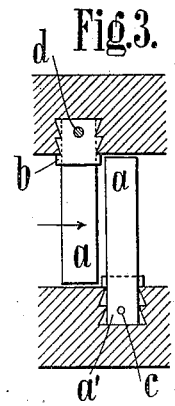
Figure 4:
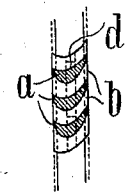
Figure 5:
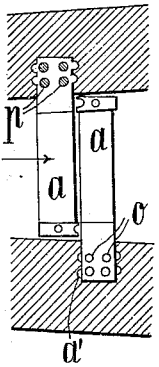
Figure 6:
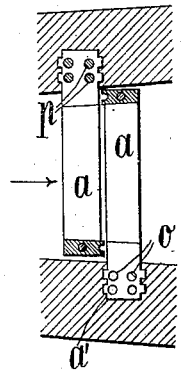
Figure 7:
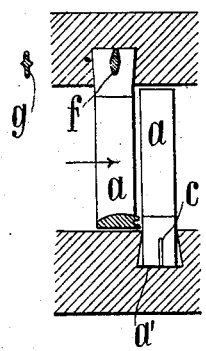
Figure 8:
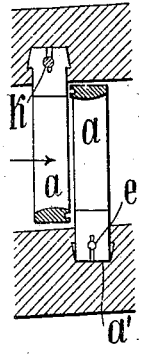
Figure 9:
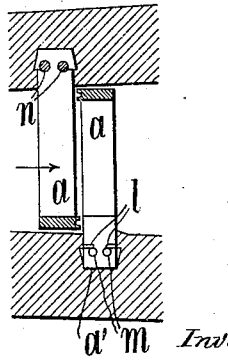
Figure 16:
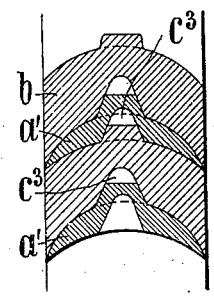
Figure 10:
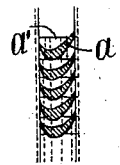
Figure 17:
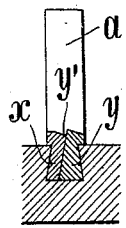
Figure 18:
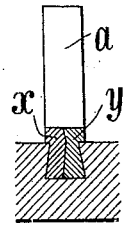

Figures 1, 2, and 3 show in section through the shell of the steam-turbine or through its rotating wheel, respectively, an example of blades with a face that is bored through for expanding out into annular rings of different profiles. Fig. 4 is a horizontal section through the blades, showing the intermediate pieces inserted in the groove. Figs. 5 and 6 show a section through the shell and rotating wheel of an example for blades with strengthened root that has a number of perforations for expanding. Figs. 7 and 8 show a similar section of blades having a strengthened and longitudinally-slit root. Fig. 9 is a like view with lateral incisions in the foot of the blade. Fig. 10 is a sectional plan on a different sale, corresponding to Fig. 9. Figs. 11, 12, 13, 14, and 15 show a plan of the annular groove with the blades and spacing-pieces pin section of varieties of fastening in which the roots of the blades have bow-shaped cross-section and are provided with holes for being opened out, and Fig. 16 shows an example of a root of a blade with a bow-shaped cross-section and provided with only one hollow or cavity. Figs. 17 and 18 show a section through the shell and rotating wheel of two examples for fastening the last blades in an annular groove having a profile according to Fig. 1.

Similar letters of reference refer to like parts in all the views.

In some examples, as in Figs. 1 to 4, roots $a'$ of blades have a curved cross-section. In other examples, as in Figs. 5 to 10, the roots $a'$ of the blades have a rectangular cross-section. As a rule the form of cross-section of the blades $a$ is such that its greatest thickness lies in the middle of the cross-section. This generally well-known form of cross-section is not illustrated in the drawings.

According to Fig. 1 the blades $a$, alternating with the intermediate pieces $b$, Fig. 4, are placed in dovetail-shaped annular grooves in one of the turbine elements—i. e., in the turbine-shell or rotating wheel, respectively. The roots $a'$ of the blades and intermediate pieces $b$ are provided with borings $c$, so that a mandrel can be driven into the borings $c$ of several blade-roots and intermediate pieces at the same time, after being put in the annular grooves to expand them in a tangential direction. The roots of the blades and the intermediate pieces are thus distended in such a way that their surfaces press tightly against one another and against the side surfaces and the bottom of the annular grooves. The blades and intermediate pieces are thus immovably fixed in their groove and the mandrel is withdrawn. An increased security of the fastening is obtained if after the opening out pins $d$ are driven in, as shown in Fig. 4, which extend through several of the roots $a'$ of the blades and intermediate pieces $b$. According to Fig. 4 blades $a$ have been taken, by way of example, which have not their greatest thickness in the center of their cross-section.

Figs. 2 and 3 show, essentially, the same fastening as Fig. 1. The annular grooves here have only another profile. The annular groove in Fig. 2 is sharply undercut close to its bottom. The annular groove in Fig. 3 is repeatedly undercut in the shape of dovetails.

In the forms shown in Fig. 5 and 6 the blades are provided with strengthened roots, so that intermediate pieces will be unnecessary. Two borings $o$ through the feet are so near to each side edge of the feet of the blades that the material on being expanded out is vigorously swelled and enters into the adjacent grooves or undercuts in the side surfaces of the annular grooves. The undercuts may, for example, be half-round, Fig. 5, or rectangular, Fig. 6. In this form of execution the roots $a'$ of the blades may be made of uniform breadth, Fig. 5, in order to allow them to be put in at any optional place. In every case after the opening out or expanding special pins $p$ may be driven into the tangential holes.

In the forms shown in Figs. 7 to 9 the blades $a$ have strengthened roots, as is seen from Fig. 10, which shows the roots in plan view, the cross-section of the root of the blade being taken as rectangular and the blades not having their greatest thickness in the middle of their cross-section.

According to Figs. 7 and 8 the strengthened roots of the blades have very narrow longitudinal slits $e$, into which a mandrel of suitable shape in cross-section—for instance, $f\ g\ k$—is driven. If need be, pins may be driven into the enlarged slits and expanded, which extend through the roots of several of the blades.

According to Fig. 9 the root $a'$ of the blade has lateral incisions $l$, which run into the borings $m$. In opening out the borings by means of mandrels $n$ the end parts of the root are driven into corresponding undercuttings of the annular groove and simultaneously pressed firmly against the bottom of the annular ring.

Where the roots of blades and intermediate pieces are distended by means of mandrels, a still firmer joining or union may be obtained, as shown in the examples illustrated in Figs. 11 to 16, where the roots $a'$ of the blades are of a general lunette-shaped cross-section and suitably-shaped intermediate pieces $b$ of bow-shaped cross-section are used.

Figure 11:
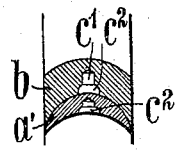

The roots $a'$ of the blades and the intermediate pieces $b$ are provided with holes of small diameter or not quite bored through, Fig. 11. The bored hole $c'$ is widened at its outer end at $c^2$. By driving in a mandrel the bottom of the hole $c'$ is pierced, and with continued driving the boss-shaped material is pressed into the enlargement $c^2$ of the hole in the adjacent root $a'$ or intermediate piece, as the case may be.

The enlargement $c^2$ on the one side and the corresponding projection on the other side may also be made without using a bored hole—for example, by pressure in a press into a shape which the enlargement $c^2$ has before the blades and intermediate pieces are put into the grooves. Thus by means of a press or the like a hollow or cavity $c^3$ in the root $a'$ of the blade or the intermediate piece $b$ may be obtained on one side and a corresponding projection on the other side, as shown in Fig. 16.

Figure 12:
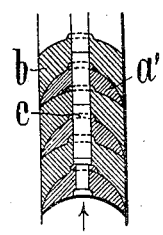
Figure 13:
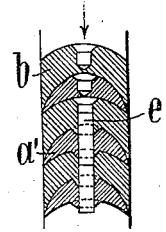

According to Fig. 12 the tangential opening out takes place, as shown by the arrow, from the concave side of the root of the blades or of the intermediate pieces and according to Fig. 13, as shown by the arrow, from the convex side. In the latter figure one foot of the blade and one intermediate piece are shown not yet opened out or expanded, the remainder being shown as brought into still closer connection by driving in the material of the bottoms of the holes into the opposite enlargements.

According to Figs. 12 and 13 special pins $e$ may be driven in, which remain in the joint.

Figure 14:
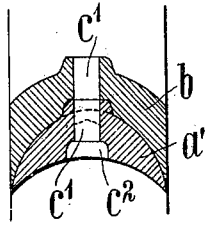
Figure 15:
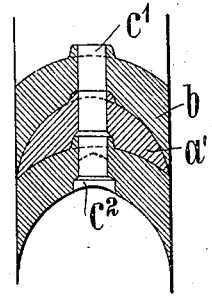

As shown in Figs. 14 and 15 on an enlarged scale the enlargements $c^2$ of the holes $c'$ may have different profiles.

All the blades up to about the three last are fastened in the above-described manner to the wheel-bodies. The last blades may be fastened in any well-known manner, as in a transverse groove.

In the manner of fastening according to Figs. 17 and 18 it is to be understood that all the blades except one or a few are fastened according to Fig. 1. For fastening the last blades both the intermediate pieces adjacent to it are divided. The halves $y$ are put in first and the halves $x$ driven in as wedges, Fig. 17, and secured by the knocking down or upsetting of the noses $y'$ of the parts $y$ on the corresponding slopes or bevel of the parts $x$, Fig. 18.

The blades are cast of suitable material, pressed under great pressure to approximately the correct shape, and then milled.

In the above-described manner of fastening the blades in annular grooves of rotating wheels or drums of steam-turbines the roots of the blades do not require to be fitted tightly preparatory to undercutting the annular grooves. The same can therefore be conveniently put in place, and special clamping-rings are unnecessary. Also a tighter fitting together of the separate wheels is possible without further weakening of the wheel-body, resulting in raising of the productive power of the steam-turbine in proportion to the necessary space. Further, the changes of shape of the wheel bodies and blades arising from the hammering down of the intermediate pieces and the clamping-rings are avoided.

I claim—

1. A fastening for blades and spacing-pieces for the blades, comprising an annular undercut groove in the element of a turbine, and the blade having a suitable continuous opening through and within the body of the root, the body of the metal of said blade being expanded into the undercut of the groove, substantially as described.

2. A fastening for blades and spacing-pieces for the blades, comprising an annular undercut groove in the element of a turbine, and the member to be secured therein having a circular opening therein lying within the groove, the metal adjacent to said opening being expanded into the undercut of the groove, substantially as described.

3. In a fastening for blades and spacing-pieces for the blades, the combination with the element of a turbine, having an annular undercut groove therein, of the spacing-piece or blade-root in said groove having openings therethrough, the body of the metal surrounding the openings being expanded into the undercuts of said groove, and a pin of suitable profile driven into the openings, substantially as described.

4. In a fastening for blades and spacing-pieces for the blades, the combination with an element of a turbine, having an annular groove therein, of blades and spacing-pieces having an opening therethrough lying within the groove, said opening larger at one face than at the other, and the smaller end of the opening surrounded by a boss entering the larger end of the opening of the next adjacent part, said boss expanded into the larger end of the next adjacent opening, substantially as described.

5. In a fastening for blades and spacing-pieces of blades, the combination with an element of a turbine having an annular undercut groove therein, of the blades and spacing-pieces having an opening therethrough lying within the groove and larger at one end than at the other, a boss around the smaller end of the opening entering the larger end of the next adjacent part, said boss expanded into the larger end of the opening and the body of the part adjacent the opening forced into the undercut of the groove, substantially as described.

6. The combination with a turbine element having an annular undercut groove; of members to be secured therein having holes formed partially through them, and perforated when in juxtaposition, the fin or boss being expanded into the hole of the next adjacent member and the body of metal surrounding the hole being expanded into the undercut of the grooves.

In testimony that I claim the foregoing as my invention I have signed my name in presence of two subscribing witnesses.

RICHARD SCHULZ.

Witnesses:
JULIUS ROJSKE,
ARNA THURAN.